United States Patent
Michel et al.

(10) Patent No.: US 10,028,130 B2
(45) Date of Patent: Jul. 17, 2018

(54) METHODS FOR UPDATING A CACHE MEMORY OF A TELECOMMUNICATIONS TERMINAL

(71) Applicant: IDEMIA FRANCE, Colombes (FR)

(72) Inventors: Alexis Michel, Colombes (FR); Aurelien Raboisson, Colombes (FR); Elder Dos Santos, Colombes (FR)

(73) Assignee: IDEMIA FRANCE, Colombes (FR)

(*) Notice: Subject to any disclaimer, the term of this patent is extended or adjusted under 35 U.S.C. 154(b) by 0 days.

(21) Appl. No.: 15/101,625

(22) PCT Filed: Dec. 4, 2014

(86) PCT No.: PCT/FR2014/053168
§ 371 (c)(1),
(2) Date: Jun. 3, 2016

(87) PCT Pub. No.: WO2015/082852
PCT Pub. Date: Jun. 11, 2015

(65) Prior Publication Data
US 2017/0006463 A1    Jan. 5, 2017

(30) Foreign Application Priority Data

Dec. 6, 2013 (FR) .................... 13 62257

(51) Int. Cl.
*H04M 3/00*     (2006.01)
*H04W 8/18*     (2009.01)
*H04W 88/02*    (2009.01)

(52) U.S. Cl.
CPC ........ *H04W 8/183* (2013.01); *H04M 2201/36* (2013.01); *H04W 88/02* (2013.01)

(58) Field of Classification Search
USPC .................. 455/411, 556.1, 418, 413, 558
See application file for complete search history.

(56) References Cited

U.S. PATENT DOCUMENTS

| 8,060,140 B2 | 11/2011 | Tak |
| 2010/0093396 A1* | 4/2010 | Roundtree ........ H04M 1/72522 455/558 |

(Continued)

FOREIGN PATENT DOCUMENTS

| GB | 2452534 A | 3/2009 |
| WO | 2009036230 A1 | 3/2009 |

OTHER PUBLICATIONS

International Search Report dated Mar. 9, 2015, for International Application No. PCT/FR2014/053168, pp. 1-5.

*Primary Examiner* — David Q Nguyen
(74) *Attorney, Agent, or Firm* — MH2 Technology Law Group, LLP

(57) ABSTRACT

The invention relates to methods and devices for updating a cache memory in a telecommunications terminal suitable for co-operating with a subscriber identity module. Some implementations of the subscriber identity module may perform operations that include detecting a modification of an elementary file and generating update data associated with the modified elementary file. During a starting stage, the operations may further include receiving a start message from the terminal; receiving a request serving to identity an elementary file for processing; sending the update data associated with the elementary file for processing; and reading the elementary file in compliance with a read command from the terminal. The invention also provides corresponding methods and devices for the terminal, and the corresponding module and terminal.

16 Claims, 5 Drawing Sheets

(56) References Cited

U.S. PATENT DOCUMENTS

| | | | |
|---|---|---|---|
| 2011/0294472 A1* | 12/2011 | Bramwell | H04W 8/04 455/413 |
| 2011/0312378 A1* | 12/2011 | Silverbrook | B41J 3/445 455/556.1 |
| 2014/0004831 A1* | 1/2014 | Yao | H04W 8/18 455/411 |

* cited by examiner

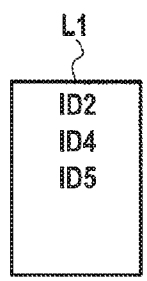 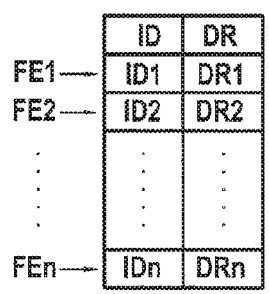 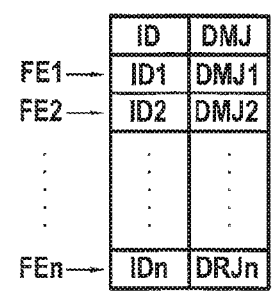
FIG.3    FIG.4    FIG.5
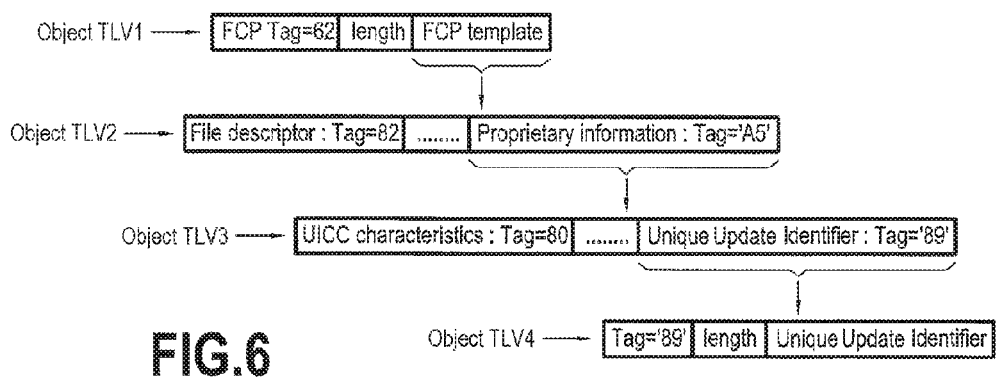
FIG.6

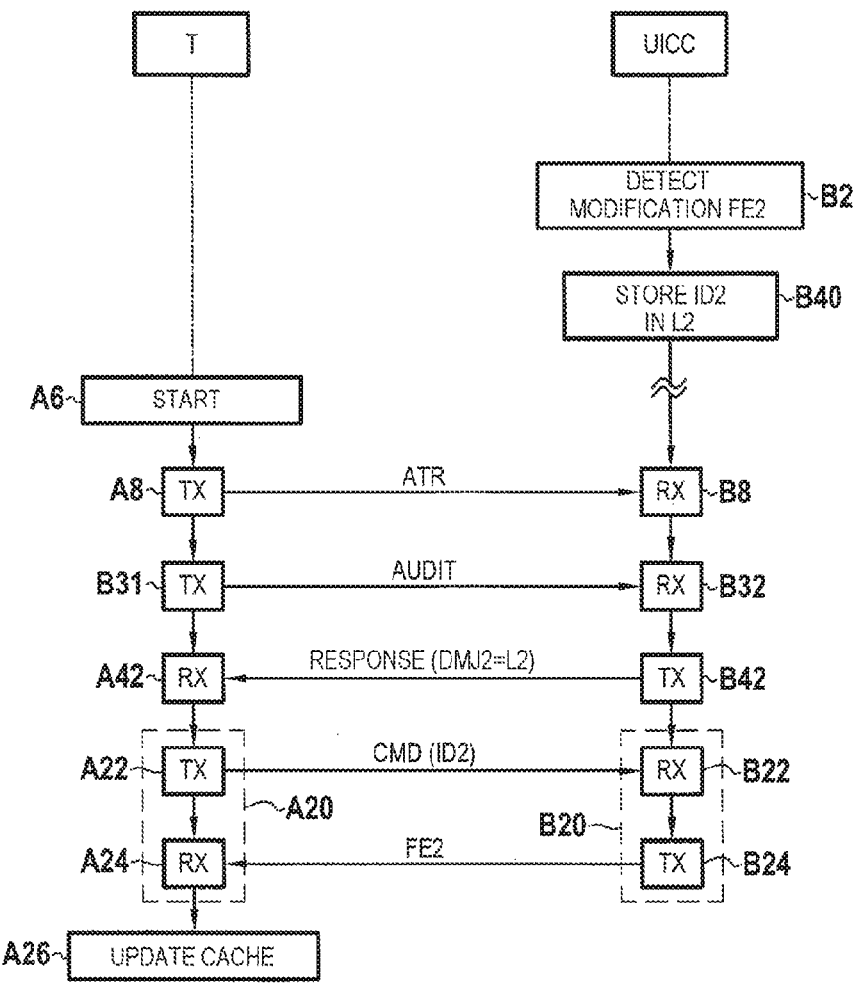

METHODS FOR UPDATING A CACHE MEMORY OF A TELECOMMUNICATIONS TERMINAL

CROSS-REFERENCE TO RELATED APPLICATIONS

This application is a U.S. National Stage application of International Application No. PCT/FR2014/053168 filed 4 Dec. 2014, which claims priority to French Application No. 1362257 filed 6 Dec. 2013, the entire disclosures of which are hereby incorporated by reference in their entireties.

BACKGROUND OF THE INVENTION

The present invention relates to updating a memory of a telecommunications terminal, and it relates more particularly to methods and devices for updating a memory, e.g. a cache memory, of a telecommunications terminal on the basis of data stored in a subscriber identity module for a subscriber to a mobile telephony network with which the terminal can co-operate.

The invention finds a particular but non-limiting application in optimizing the updating of a cache memory of a telecommunications terminal, e.g. of the wireless type.

In known manner, wireless telecommunications terminals, e.g. such as mobile telephones or the equivalent, are designed to co-operate with an identity module of a subscriber to a mobile telephony network, also known as a universal integrated circuit chip (UICC) or as a UICC module, in order to be able to communicate with a given telecommunications network. A UICC module is sometimes also commonly referred to as a SIM card. A subscriber identity module may be embodied in an embedded or removable component of the secure element type (eSE or SE) constituted by a chipset that is distinct from the main terminal of the mobile terminal. By way of example, the subscriber identity module may satisfy the specifications of ISO 7816 (ETSI standard TS 102 223), or indeed the common criteria standard (ISO/CEI 15408). It can dialog with the mobile terminal in which it is embedded or incorporated, by using application protocol data unit (APDU) frames.

The UICC module enables the mobile telephone in which it is generally inserted or embedded to interact with a telecommunications network. To do this, the UICC module contains information for accessing the network, in particular a unique "international mobile subscriber identity" (IMSI) associated with a particular subscription of a user with the associated telephony operator.

The UICC module also generally includes data stored in elementary files. By way of example, an elementary file may contain contact data of an address book (telephone number, name, address, etc.), SMSs, or other useful information.

By way of example, a mobile telephone using a UICC module can access such elementary files when interacting with the user or with the telecommunications network.

Because of the relatively long length of time needed by the telecommunications terminal to access data contained in the elementary files of the UICC module, and given the repeated access thereto while the terminal is in operation, the terminal (or more precisely a communications interface of the terminal such as a modem, for example) may be configured to store copies of the elementary files of the UICC module in a cache memory of the terminal in order to reduce access times.

Thus, during a stage of the user starting the telecommunications terminal, the terminal generally performs a complete update of its cache memory by storing all of the elementary files that it recovers for this purpose from the UICC module.

Unfortunately, while updating the cache memory in this way, the terminal must necessarily read and copy into the cache memory all of the elementary files of the UICC module, even though only some of these files have actually been modified since the most recent operation of updating the cache memory.

In other words, the Applicant has observed that, on starting, the terminal must necessarily read and copy all of the data in the elementary files of the UICC module, including data that, a priori does not need to be updated in the cache memory. Furthermore, the number of applications and services implemented on the UICC module is tending to increase, so the access time required on starting in order to read the data from the elementary files is also increasing to the detriment of the speed of execution and the general quality of the user experience.

Thus, there exists a need for a solution that, during a stage of starting the telecommunications terminal, enables a memory of the terminal (e.g. a cache memory) to be updated quickly and more effectively on the basis of the data contained in the UICC module.

OBJECT AND SUMMARY OF THE INVENTION

To this end, the present invention provides a method of updating the content of a memory, e.g. a cache memory, in a telecommunications terminal suitable for co-operating with a subscriber identity module for accessing a telecommunications network, the method being performed by the subscriber identity module, the method comprising:
  detecting an operation of modifying at least one first elementary file in said module; and
  generating update data associated with said modified at least one first elementary file; and
  comprising during a stage of starting the terminal:
  receiving a start message coming from the terminal; then
  receiving a selection request from the terminal to enable the subscriber identity module to identify at least one second elementary file for processing that is contained in or that used to be contained in the subscriber identity module;
  on receiving said selection request, sending the update data associated with said at least one first elementary file; and
  performing an operation of reading said at least one first elementary file or said at least one second elementary file for processing in compliance with a read command received from the terminal in response to sending said update data.

The present invention presents numerous advantages. The updating method of the invention enables the memory (e.g. the cache memory) of a telecommunications terminal to be updated in optimized manner from data contained in the UICC module with which the terminal co-operates.

When the terminal starts, it is capable of determining which elementary files need to be updated in the memory in question and it then advantageously proceeds to read only those elementary files from the UICC module. As mentioned above, the operations of reading from the UICC module take time that correspondingly slows down the stage of starting the terminal. The invention makes it possible to limit the number of read operations that need to be performed in order to update the memory, thereby achieving a saving in time when starting the terminal, and thus significantly improving the quality of the user's experience.

Furthermore, the invention presents the advantage in that, on starting, the terminal is informed whenever updating is necessary. The terminal is capable of distinguishing between the situation in which the UICC module in question does not perform the method of the invention and the situation in which the UICC module does perform the method of the invention but there is no need to update the memory on starting the terminal.

Furthermore, there is no need to change fundamentally the stage of starting the terminal in order to embody the terminal. The modifications required in the operation of the terminal can easily be installed in present or future terminals.

In addition, if necessary, the invention can be retrofitted to telecommunications terminals and UICC modules that do not perform the invention. By way of example, a conventional telecommunications terminal does not take account of the update data (e.g. TLV objects) that it receives from the UICC module. Likewise, a conventional UICC module does not set about managing update data if it does not perform the invention.

In a particular implementation, the selection request contains an identifier for each second elementary file for processing contained in the subscriber identity module.

In a particular implementation, at least one first elementary file and said at least one second elementary file are identified by the same identifier.

In a particular implementation, said generated update data is a random number or the value of a counter, said update data being modified on detecting each modification operation.

By way of example, using such a random number is advantageous in that it makes it simple to determine whether a modification has taken place to the associated elementary file, as described in greater detail below.

In a particular variant, the update data is a counter that is incremented or decremented by a predetermined value each time a modification operation is detected.

The use of a counter is advantageous in that it makes it simple to determine whether a modification has taken place to the associated elementary file, as described in greater detail below. In addition, this technique guarantees that the update data DMJ is different for each modification of an elementary file over a given period.

In a particular implementation, status data that can take a first value or a second value is associated with each first elementary file contained in the subscriber identity module, and the method comprises:

on detecting each operation of modifying a first elementary file, giving said second value to the status data associated with said first elementary file; and wherein the update data sent by the subscriber identity module includes an identifier for each first elementary file having its status data equal to the second value.

In a particular implementation, the method comprises:

on detecting each operation of modifying a first elementary file, storing an identifier of said first elementary file in a list, and wherein the update data comprises said list.

In a particular implementation, the various steps of the updating method performed by the subscriber identity module are determined by computer program instructions.

Consequently, the invention also provides a computer program on a data medium, the program being suitable for being performed in a processor, or more generally in a subscriber identity module, the program including instructions adapted to performing steps of updating a memory as defined above.

The invention also provides a data medium (or recording medium) that is readable by a computer and that includes instructions for a computer program as mentioned above.

Correspondingly, the invention provides a method of updating the content of a memory, e.g. a cache memory, in a telecommunications terminal suitable for co-operating with a subscriber identity module for accessing a telecommunications network, the method being performed by the telecommunications terminal, the method comprising during a stage of starting the terminal:

sending a start message to the subscriber identity module; then sending a selection request to the subscriber identity module in order to enable the subscriber identity module to identify at least one second elementary file for processing contained in or that used to be contained in the subscriber identity module;

in response to said selection request, receiving update data associated with at least one first elementary file contained in or that used to be contained in the subscriber identity module;

on the basis of said received update data, determining, for each second elementary file for processing, whether said second elementary file has been modified; and if so, a step of updating said at least one first elementary file or said at least one second elementary file in the memory of the terminal.

The above-mentioned advantages and comments applying to the method performed by the subscriber identity module apply in the same way to the method when performed by the terminal and to variants of that method.

In a particular implementation, the selection request contains an identifier for each second elementary file for processing contained in the subscriber identity module.

In a particular implementation, said at least one first elementary file and said at least one second elementary file are identified by the same identifier.

In a particular implementation, the method comprises:

from a first list of at least one elementary file identifier, determining an identifier of said at least one second elementary file to be processed or an identifier of a directory containing the identifier of said at least one second elementary file, said directory being contained in the subscriber identity module; and inserting said identifier in the selection request for sending to the subscriber identity module.

In a particular implementation, the method comprises:

prior to the starting stage, storing in a non-volatile memory reference data in association with said at least one first elementary file for processing;

wherein, during said determination, the terminal compares said reference data associated with said first elementary file and said corresponding update data to determine whether said elementary file has been modified.

In a particular implementation, the terminal determines that said elementary file has been modified when said reference data associated with said first elementary file and said corresponding update data are different.

In a particular implementation, the update data received from the subscriber identity module comprises an identifier for each elementary file.

In a particular implementation, the various steps of the method performed by the terminal are determined by computer program instructions.

Consequently, the invention also provides a computer program on a data medium, the program being suitable for being performed in a processor, or more generally in a computer, the program including instructions adapted to perform steps of a method performed by a terminal as defined above.

The invention also provides a data medium (or recording medium) that is readable by a computer, and including instructions of a computer program as mentioned above.

It should be observed that the above-mentioned program may use any programming language and be in the form of source code, object code, or code intermediate between source code and object code, such as in a partially compiled form or in any other desirable form.

In addition, the above-mentioned data media may be any entity or device capable of storing the program. For example, the medium may comprise storage means such as a read only memory (ROM), e.g. a compact disk (CD) ROM or a microelectronic circuit ROM, or indeed magnetic recording means, e.g. a floppy disk or a hard disk.

Furthermore, the data media may correspond to a transmissible medium such as an electrical or optical signal, that can be conveyed via an electrical or optical cable, by radio, or by other means. The program of the invention may in particular be downloaded from an Internet type network.

Alternatively, the data media may correspond to an integrated circuit in which the program is incorporated, the circuit being adapted to execute or to be used in the execution of the method in question.

The invention also provides a method of updating the content of a memory, e.g. a cache memory, in a telecommunications terminal suitable for co-operating with a subscriber identity module in order to access a telecommunications network, the method being performed:
  by the telecommunications terminal performing a method as defined above; and
  by the subscriber identity module performing a method as defined above.

The invention also provides a subscriber identity module and a terminal suitable respectively for performing the steps of the above methods as performed by said module and said terminal.

More particularly, the invention provides a subscriber identity module for performing a method of updating the content of a memory, e.g. a cache memory, in a telecommunications terminal, said subscriber identity module being suitable for co-operating with the telecommunications terminal in order to enable said terminal to access a telecommunications network, said subscriber identity module comprising:
  a unit for detecting an operation of modifying at least one first elementary file in said module; and
  a unit for generating update data associated with said modified at least one first elementary file, and including, during a stage of starting the terminal:
    a reception unit for receiving a start message from the terminal;
    a reception module for receiving a selection request from the terminal, in order to enable the subscriber identity module to identify at least one second elementary file for processing contained in or that used to be contained in the subscriber identity module;
    a send unit for acting on reception of said selection request to send the update data associated with said at least one first elementary file; and
    a unit for performing a read operation of said at least one first elementary file or said at least one second elementary file for processing, in compliance with a read command received from the terminal in response to sending said update data.

The invention also provides a telecommunications terminal for performing a method of updating the content of a memory, e.g. a cache memory, of said terminal, said terminal being suitable for co-operating with a subscriber identity module in order to access a telecommunications network, the terminal comprising, during a stage of starting the terminal:
  a send unit for sending a start message to the subscriber identity module;
  a send unit for sending a selection request to the subscriber identity module in order to enable the subscriber identity module to identify at least one second elementary file for processing contained in or that used to be contained in the subscriber identity module;
  a reception unit for acting in response to said selection request to send update data associated with at least one first elementary file contained in or that used to be contained in the subscriber identity module;
  a unit for acting on said received update data to determine for each second elementary file for processing whether said second elementary file has been modified; and
  if so, a unit for updating said at least one first elementary file or said at least one second elementary file in the memory of the terminal.

The invention also provides a telecommunications system comprising:
  a subscriber identity module as defined above; and
  a telecommunications terminal as defined above, said terminal being suitable for co-operating with the subscriber identity module in order to access a telecommunications network.

The various implementations and variants as defined above for the methods of the invention as performed by the subscriber identity module and by the terminal apply respectively in the same manner to the above-defined identifier module and terminal.

The invention also provides a method of updating the content of a memory, e.g. a cache memory, in a telecommunications terminal suitable for co-operating with a subscriber identity module for accessing a telecommunications network, the method being performed by the subscriber identity module, the method comprising:
  detecting a modification made to at least one elementary file contained in or that used to be contained in said module;
  generating update data associated with said modified at least one elementary file; and
  comprising during a stage of starting the terminal:
  receiving a start message coming from the terminal; then
  receiving a selection request from the terminal to enable the subscriber identity module to identify at least one elementary file for processing which file is contained in the subscriber identity module or used initially to be contained in the subscriber identity module before said modification to said elementary file; and
  on receiving said selection request, sending the update data associated with each elementary file for processing.

In a particular implementation, the method further comprises an operation of reading at least one elementary file for processing in compliance with a read command received from the terminal in response to sending said update data.

The invention also provides a method of updating the content of a memory, e.g. a cache memory, in a telecommunications terminal suitable for co-operating with a subscriber identity module for accessing a telecommunications network, the method being performed by the telecommunications terminal, the method comprising during a stage of starting the terminal:
- sending a start message to the subscriber identity module; then
- sending a selection request to the subscriber identity module in order to enable the subscriber identity module to identify at least one elementary file for processing, said file being contained in said subscriber identity module or used initially to be contained in the subscriber identity module before said modification to said elementary file;
- in response to said selection request, receiving update data associated with at least a first elementary file for processing;
- on the basis of said received update data, determining, for each second elementary file for processing, whether said elementary file has been modified in the subscriber identity module; and
- if so, a step of updating said elementary file in the memory of the terminal.

BRIEF DESCRIPTION OF THE DRAWINGS

Other characteristics and advantages of the present invention appear from the following description made with reference to the accompanying drawings, which show embodiments and implementations having no limiting character. In the figures:

FIG. 3 is a diagram showing an example list of elementary file identifiers for processing contained in the terminal;

FIG. 4 is a diagram showing reference data stored by the terminal in association with each elementary file identifier, in accordance with a first implementation of the invention;

FIG. 5 is a diagram of update data stored in the subscriber identity module in association with each elementary file identifier;

FIG. 6 shows the structure of a data response including update data as sent by the subscriber identity module to the terminal in accordance with a particular implementation;

FIG. 8 is a diagram showing status data stored by the subscriber identity module in association with each elementary file identifier, in accordance with the second implementation of the invention; and FIG. 9 is a flow chart showing the main steps of memory updating methods performed respectively by the terminal and the subscriber identity module of FIG. 1 in accordance with a third implementation of the invention.

DETAILED DESCRIPTION OF IMPLEMENTATIONS

The present invention relates to updating a memory of a telecommunications terminal and more particularly it relates to methods and devices for updating a memory, e.g. a cache memory, in a telecommunications terminal on the basis of data stored in a subscriber identity module with which the terminal can co-operate.

In this document, implementations of the invention are described with reference to a mobile telephone. Nevertheless, it should be understood that the invention applies more generally to any telecommunications terminal, preferably a wireless terminal, suitable for co-operating with a subscriber identity module in order to access a communications network. Such a terminal may be a mobile telephone, a tablet, a computer, or the equivalent, for example.

In this document, a subscriber identity module is referred to by the term "UICC module".

Furthermore, the implementations described below relate to updating a cache memory. More generally, the invention applies to updating any memory in a telecommunications terminal.

Figure 1:
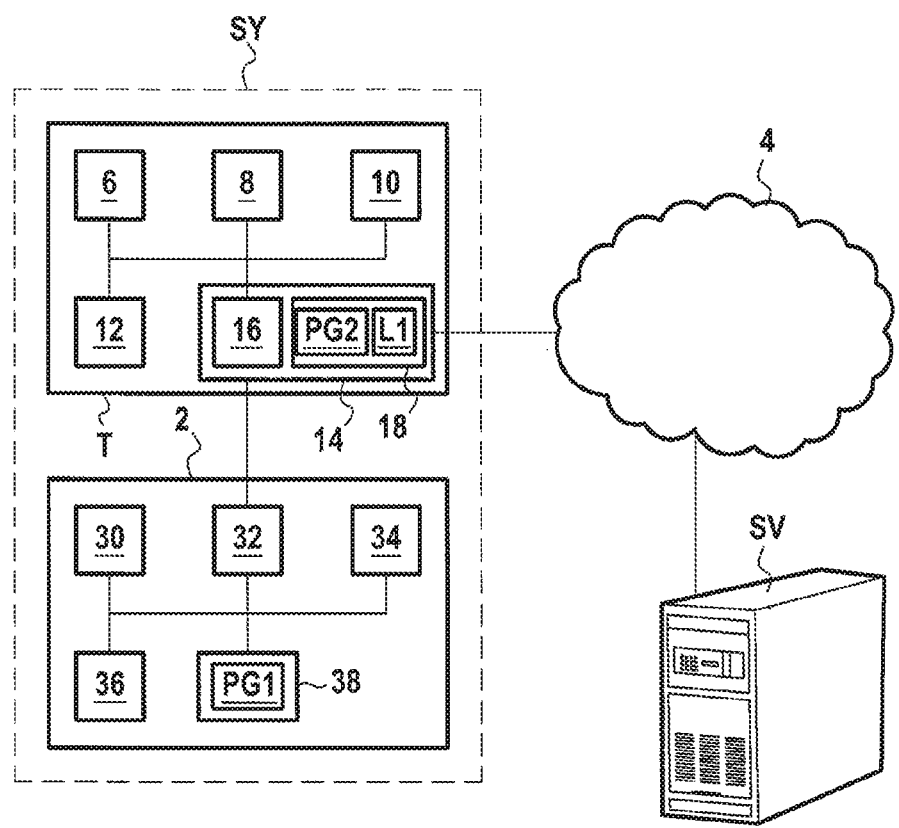
FIG. 1 is a diagram showing the hardware architecture of a telecommunications terminal and of a subscriber identity module in accordance with a particular embodiment of the invention.

FIG. 1 is a diagram of the hardware architecture of a telecommunications terminal T and of a UICC module 2 in a particular embodiment of the invention. In this example, the UICC module 2 complies with the ISO 7816 standard.

Furthermore, the telecommunications terminal in this example is a mobile telephone suitable for co-operating with the UICC module 2 in order to communicate with the telecommunications network 4. In this example, the telecommunications network is made available by the telephony operator that issued the UICC module 2. By using the UICC module, the terminal T is capable for example of communicating with a remote server SV via the network 4. By way of example, the remote server SV makes available services that are accessible by the terminal T using the UICC module 2.

More particularly, the terminal T comprises a microprocessor 6, a read only memory (ROM) 8, a rewritable volatile memory (RAM) 10, a rewritable non-volatile memory (EEPROM) 12, and a communications interface 14 enabling the terminal T to communicate with the UICC module 2 and with the network 4.

In this example, the communications interface 14 is a baseband modem. Furthermore, the UICC module 2 is inserted in the terminal T itself, even though other arrangements can be envisaged. In this example, the system SY comprises the terminal T and the UICC module 2. By way of example, the UICC module 2 is inserted or embedded in the terminal T.

In this example, the communications interface 14 has a dedicated microprocessor (not shown) together with a cache memory 16 and a volatile memory 18. The memory 18 stores a list L1 of content and purpose that are described below.

In this example, the non-volatile memory 18 constitutes a data medium in accordance with the invention that is readable by the communications interface 14, and that stores a computer program PG2 in accordance with the invention, including instructions for acting via the communications interface 14 and more generally via the terminal T to execute steps of a method of the invention for updating the content of the cache memory 16. The main steps of this method are shown in a first particular implementation of the invention in FIG. 2, which is described below.

In this example, the UICC module 2 has a microprocessor 30, a communications interface 32 suitable for communicating with the communications interface 14, a rewritable volatile memory (RAM) 34, a rewritable non-volatile memory 36, and a read only memory (ROM) 38.

In this example, the ROM 38 constitutes a data medium in accordance with the invention that is readable by the microprocessor 30 and that stores a computer program PG1 in accordance with the invention, including instructions enabling the UICC module 2 to execute steps of a method of the invention for updating the content of the cache memory 16. The main steps of this method are shown in a first particular implementation in FIG. 2, which is described below.

Furthermore, the UICC module 2 contains a certain number of elementary files (not shown) FE1 to FEn (referred to collectively as FE) that are stored in a non-volatile memory (EEPROM 12, for example) of the UICC module 2, where n is a non-zero integer. By way of example, these elementary files SE may contain contact data of an address book (telephone number, name, address, etc.), SMSs, and/or other useful information. The terminal T can use this data when it interacts with the user or with the telecommunications network 4.

Furthermore, the communications interface 14, and more generally the terminal T, is configured to store in its cache memory 16 the elementary files FE that are contained in the UICC module 2.

When the terminal T is started (or initialized), e.g. on command of the user, the communications interface 14 is configured to update the content of the cache memory 16 from the elementary files FE contained in the UICC module 2. Below in this document, it is considered more generally that it is the terminal 2 that performs the method of the invention for updating the cache memory 16.

As observed by the Applicant, the access time required by the terminal T to read the elementary files FE in the UICC module is relatively long, thereby degrading the speed with which the sequence for starting the terminal T is executed, and thus greatly reducing the quality of the user's experience.

Thus, the present invention proposes an optimized method of updating the cache memory 16 of the terminal T, in particular so as to limit operations of reading elementary files FE in the UICC module 2 and thereby accelerate significantly the stage of starting the terminal T.

A first implementation of the invention is described herein with reference to FIGS. 1 to 6. More precisely, the UICC module 2 and the terminal T together perform updating methods of the invention by executing the programs PG1 and PG2, respectively.

As shown in FIG. 5, in this example, the UICC module 2 contains update data DMJ1 to DMJn in memory in association respectively with the identifiers ID1 to IDn of each elementary file FE1 to Fen, where n is a non-zero integer.

Figure 2:
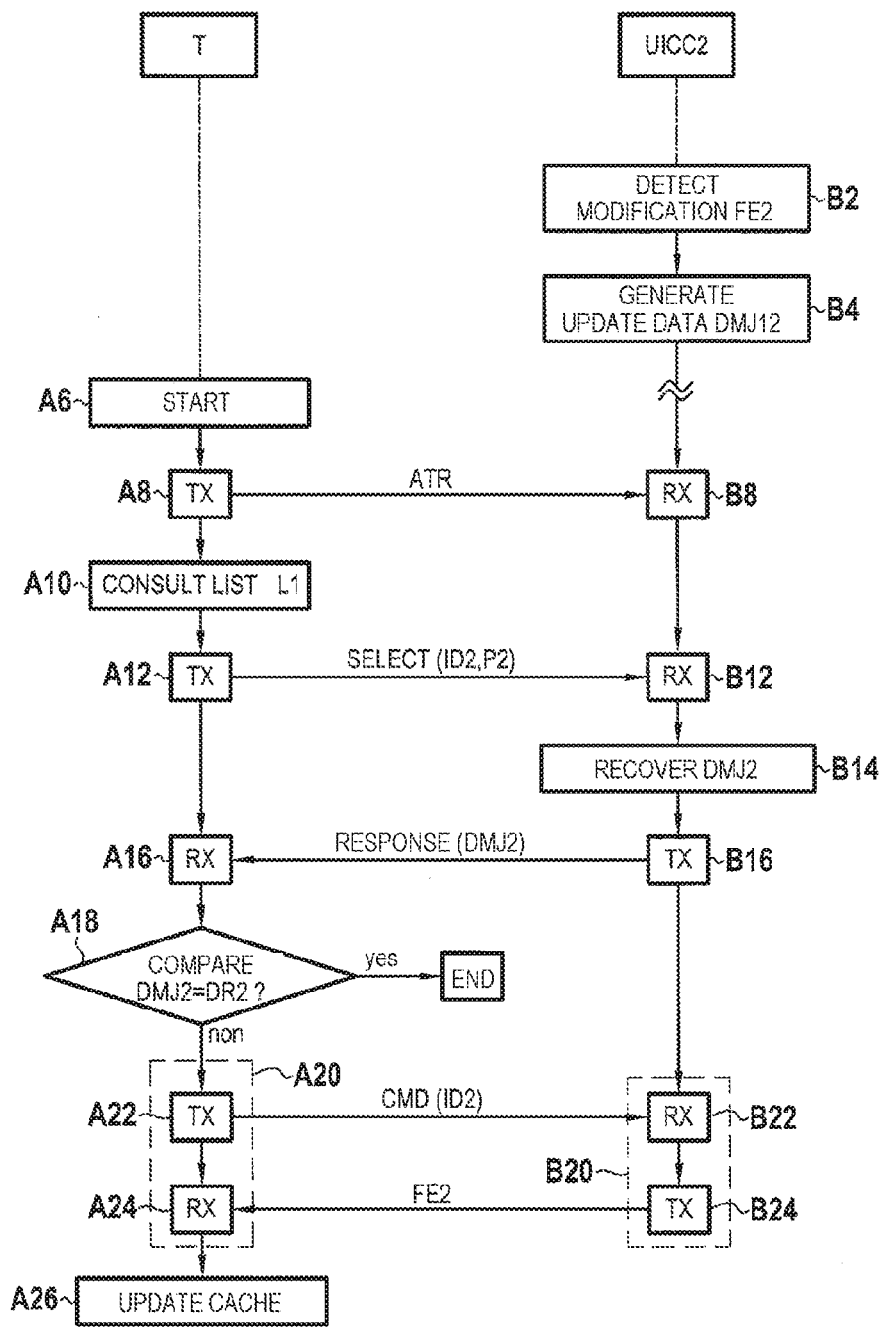
FIG. 2 is in the form of a flow chart showing the main steps of updating methods performed respectively by the terminal and by the subscriber identity module of FIG. 1, in accordance with a first implementation of the invention.

During a step B2 shown in FIG. 2, the UICC module 2 detects that an operation has been performed that modifies one or more elementary files FE contained in said UICC module. In other words, the UICC module 2 detects that a modification has been made in one or more elementary files FE. By way of example, this detection process is performed on demand in response to a command, or on detecting an event, or else it is performed continuously between two successive stops of the terminal T.

On each detection B2 of an operation of modifying an elementary file FE, the UICC module 2 modifies (B4) the update data DMJ associated with said modified elementary file. In other words, new update data DMJ is generated on each detection B2. Thus, the update data DMJ as generated in this way is different from the update data DMJ that was associated with the corresponding elementary file FE prior to the generation step B4.

It should be observed that a modification operation in the meaning of the invention may correspond to modifying pre-existing data contained in an elementary file, to deleting the elementary file, or indeed to creating a new elementary file. Under all circumstances, there has indeed been a modification to the elementary file in question.

When the modification in question comprises deleting an elementary file FE, the modification operation detected by the UICC module 2 relates to the elementary file that used to be contained in the UICC module 2 before the modification (i.e. deleting) took place.

Consideration is given at this point to the situation in which the UICC module 2 detects (B2) an operation of modifying the elementary file FE2 such that the UICC module 2 modifies the update data DMJ2 stored in association with the file FE2 (or more precisely with the identifier ID2).

In this example, the content of the elementary file FE2 is modified, for example, during updating triggered by the user or remotely (e.g. changes to contact data specific to a profile in the user's address book).

In a first implementation, the value of the update data DMJ is calculated by means of a hashing function, e.g. having as its parameter the content of the elementary file in question.

In a second implementation, the update data DMJ is a random number that is modified on each detection B2 of a modification operation. In preferred manner, this random number is capable of taking a large enough number of values for the risk of the same value being given to the random number within a period of time is very low.

The use of such a random number is advantageous in that it makes it simple to determine whether there has been a modification to the associated elementary file, as described in greater detail below.

In a third implementation, the update data DMJ is a counter of value that is modified each time a modification operation is detected. In a particular example, the counter is incremented or decremented by a predetermined value on each detection B2.

The use of a counter is advantageous in that it makes it simple to determine whether there has been a modification to the elementary file, as described in greater detail below. Furthermore, this technique guarantees that the update data DMJ is different for each modification of an elementary file over a given period.

Consideration is given at this point to the situation in which the terminal T has been switched off and subsequently restarted. The following steps of the method are thus performed during a starting (or initialization) stage of the terminal T that takes place when the terminal is switched on A6.

Starting A6 of the terminal T causes an initialization command to be sent (A8) to the UICC module 2. By way of example, this initialization command is an "answer to reset" (ATR) command in compliance with the ISO 7816 standard.

After sending the ATR command, the terminal T consults (A10) the list L1 stored in the non-volatile memory 18. The terminal thus determines (A10) the identifier ID of each elementary file FE that is to be processed. The list L1 contains at least one identifier ID of an elementary file FE.

In the presently-described example, the list L1 contains the identifiers ID2, ID4, and ID5 shown in FIG. 3 and corresponding respectively to the elementary files FE2, FE4, and FE5. Consideration is given at this point to the situation in which the terminal T decides to begin by processing the elementary file FE2. The remainder of the method may be repeated for each elementary file FE identified in the list L1 (i.e. the elementary files FE4 and FE5 in this example).

In the presently-considered example, the list L1 is stored locally in the terminal T. In a variant, the list L1 is stored outside the terminal T and is accessible to the terminal in order to enable it to perform the step A10. Other implementations not involving the use of such a list L1 could also be envisaged.

During a step A12, the terminal T sends a selection request (SELECT) to the UICC module 2, this request in this example containing the identifier ID2 of the elementary file FE2. It is possible to envisage the situation in which such a selection request comprises a plurality of identifiers of elementary files to be processed.

In a particular example, the selection request is an APDU command known as "SELECT FILE", in compliance with the 7816 standard. In this example, the request SELECT contains the parameter P2=4 informing the UICC module 2 that during forthcoming step B16 it is to return in particular the update data DMJ2.

After receiving (B8) the ATR start message, the UICC module thus receives (B12) the selection request SELECT.

On receiving B2 the request SELECT, the UICC module 2 recovers (B14) and then sends (B16) the update data DMJ2 stored in the UICC module 2 in association with the elementary file FE2.

In this example, the update data DMJ2 is sent (B16) in a message RESPONSE.

The update data DMJ2 may be specified for example in one or more tag length value (TLV) objects in compliance with the standards ISO 7816-4 or ETSI TS 102.221. By way of example, FIG. 6 shows the structure of the message RESPONSE. In this example, the message RESPONSE is an object TLV1 having tag=62 and the value is the data FCP as defined in the ETSI TS 102.221 standard. This value contains a second TLV object TLV2 having tag=82 and its value contains priority information (tag=A5).

In accordance with the invention, a third TLV object TLV3 with tag=80 is inserted in the proprietary information A5. This object TLV3 contains in particular a unique update identifier with tag=89. In this example, this unique identifier corresponds to update data DMJ in the meaning of the invention and is in the form of a fourth TLV object TLV4 with tag=89 and containing the value of the update data.

Nevertheless, the data structure of FIG. 6 is given purely by way of illustration, and other implementations of this update data can be envisaged in the context of the invention.

After reception (A16) of the update data DMJ2, the terminal uses the update data DMJ2 to determine (A18) whether the corresponding elementary file FE2 has been modified.

In the presently-considered example, it is assumed that, at a reference instant TR prior to the detection step B2 and thus prior to starting A6 of the terminal T, the terminal T performed a step of storing reference data DR1 to DRn (collectively referred to as DR) in its non-volatile memory 18 in association with the identifiers ID1 to IDn respectively, as shown diagrammatically in FIG. 4.

By way of example, that reference instant TR corresponds to the time at which the previous update of the cache memory 16 terminated.

The reference data DR may for example be equal to the update data DMJ that was stored in the UICC module 2 at the instant TR. More generally, the reference data DR specifies a reference state for the elementary files FE stored in the non-volatile memory 18 of the terminal T at the reference moment TR.

In the present example, the terminal T acts in step A18 to compare the reference data DR2 of the elementary file FE2 being processed with the corresponding update data DMJ2, and on the basis of this comparison it determines whether the elementary file FE2 has been modified.

More precisely, in this particular example, when the terminal T detects that the reference DR2 and the update data DMJ2 are identical, it deduces that the file FE2 has not been modified (i.e. there has been no modification since the above-mentioned reference moment TR). Under such circumstances, the method ends, or where appropriate, the method returns to step A10 for each of the still unprocessed elementary files in the list L1 (i.e. FE4 and FE5 in this example).

In contrast, when the terminal T detects that the reference data DR2 and the update data DMJ2 are not identical, it deduces that the elementary file FE2 has been modified (i.e. that there has been at least one modification to FE2 since the reference instant TR).

In a particular implementation, the terminal T also replaces the reference data DR2 with the update data DMJ2, once step A18 has been performed.

When the result of the comparison A18 is negative (modification of FE2 detected), the terminal T performs (A20) a step of updating A26 the elementary file FE2 in the cache memory 16 from the elementary file FE2 contained in the UICC module 2.

In this implementation, the terminal T performs (A20) for this purpose an operation of reading A20 the file FE2 in the UICC module 2. During this read step, the UICC module 2 authorizes (B20) the terminal T to access the file FE2 contained in the UICC module 2. To do this, the terminal T sends (A22) a read command CMD containing the identifier ID2 of the elementary file FE2 to be read. On receiving (B22) this command CMD, the UICC module 2 sends (B24) the requested file FE2 to the terminal T.

Thereafter, the terminal performs the step A26 of updating the cache memory 16 on the basis of the file FE2 received in step A24.

In a particular example, the terminal repeats the method from step 10 in order to determine which elementary files FE have still not been processed, thus executing the following steps (A12 to A26) in succession for each elementary file specified in the list L1.

In a variant of the first implementation as described above with reference to FIG. 2, consideration is given to the situation in which an elementary file FE contained in the UICC module 2 includes at least one identifier ID of another elementary file FE that needs to be updated. By way of example, it may be envisaged that the elementary file FE1 in the UICC module 2 has the identifiers ID2 and ID4. The elementary file FE1 then acts as a directory that contains the identifiers ID2 and ID4.

Under such circumstances, on receiving B12 the request SELECT containing the identifier ID2, the UICC module acts in step B14 to detect that the identifier ID2 is contained in the elementary file FE1. The UICC module then sends (B16) the update data DMJ1 associated with the elementary file FE1 to the terminal T. On the basis of a comparison between the update data DMJ1 and the reference data DR1 associated with the file FE1, the terminal T then determines (A18) whether at least one elementary file having its identifier contained in the elementary file FE1 (i.e. FE2 and FE4 in this example) has been modified.

If so, the terminal T proceeds to read the file FE2 and if necessary to update it in the cache memory 16. In a particular variant, the terminal T also proceeds to read the file FE4 identified in the file FE1 and if necessary to update it in the cache memory 16.

In another variant, prior to the sending step A12, the terminal T knows that the elementary file FE2 that it seeks to process is identified in the elementary file FE1 contained in the UICC module 2. Under such circumstances, the request SELECT sent by the terminal T in step A12 includes the identifier ID1 and not the identifier ID2. From the identifier ID1 that it receives (B12), the UICC module 2 recovers (B14) the update data DMJ1 associated with FE1 and sends (B16) this update data to the terminal T which processes it as described for the above variant.

In this document, and unless specified to the contrary, it should be observed that elements that are common to two distinct implementations are given the same reference signs and present characteristics that are identical, such that they are not described again for reasons of simplicity.

Figure 7:
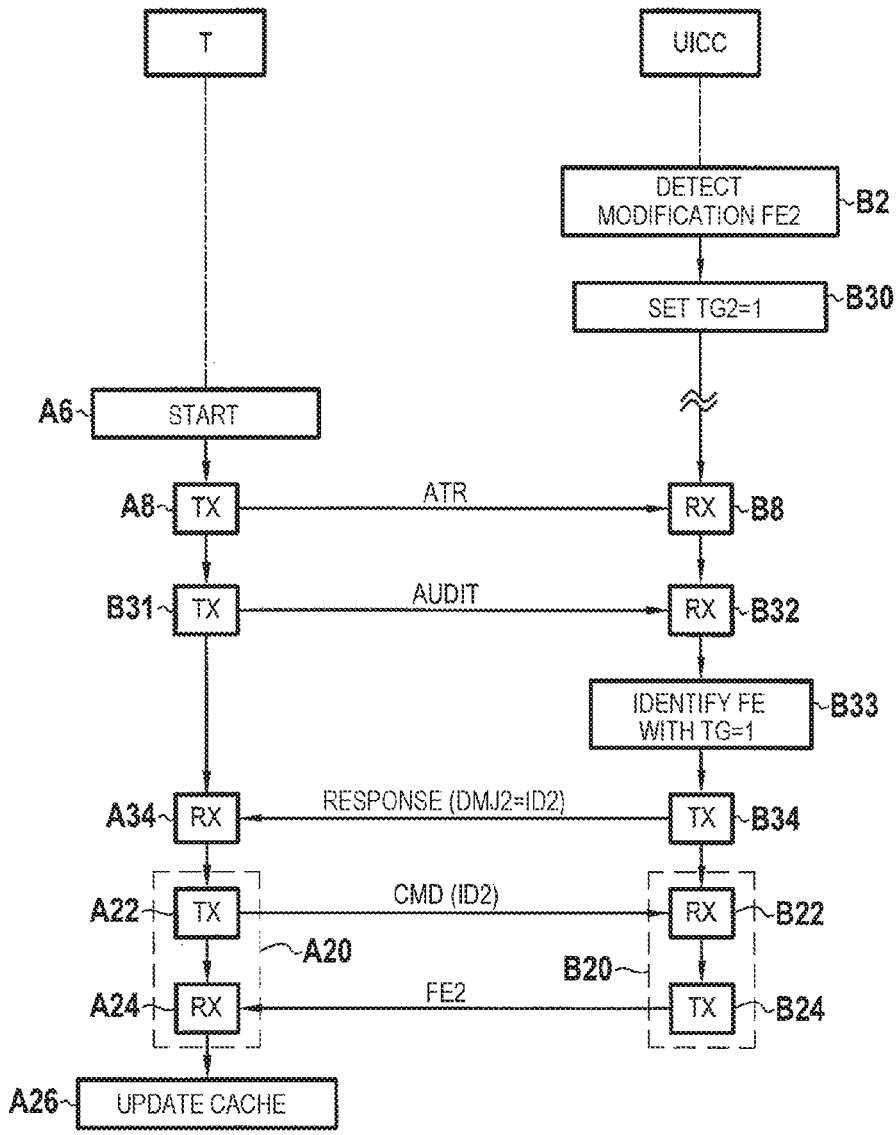
FIG. 7 is a flow chart showing the main steps of memory updating methods performed respectively by the terminal and by the subscriber identity module of FIG. 1 in accordance with a second implementation of the invention.

A second implementation of the invention is described below with reference mainly to FIGS. 7 and 8.

In this second implementation, the status data (or "tag") TG1 to TGn (respectively referred to as TG) is stored by the UICC module 2 in association with the elementary files FE1 to FEn, or more precisely in this example, in association with the respective identifiers ID1 to IDn, as shown diagrammatically in FIG. 8.

Each item of status data TG may take a first value or a second value that is distinct from the first, namely the values "0" and "1" respectively in the present example. In this example, the status data TG is set by default to 0.

Still in this example, the status data TG is managed, and more particularly the steps B2 to B24 of the method from the point of view of the UICC module 2 are performed by an application or applet (e.g. a JAVACARD applet) that runs in the UICC module 2.

In this second implementation, the UICC module 2 performs the step B2 as described above. By way of example, a modification of an elementary file FE is detected (B2) when a predefined event occurs to which the UICC module 2 is a subscriber. By way of example, this event may be an event of a change of content in an elementary file, a deletion event, or indeed an event of creating an elementary file in the UICC module 2.

On each detection of an operation of modifying an elementary file FE in the UICC module 2, it gives (B30) the second value (i.e. the value 1) to the corresponding status data TG. In this example, consideration is given to the situation in which the terminal T detects (B2) that the elementary file FE2 has been modified and consequently gives (B30) the value 1 to TG2.

When the pair [ID2, TG2] did not exist at the moment of detecting B2 a modification to FE2, the UICC module 2 creates this pair and gives the value 1 to TG2.

It is assumed below that the terminal T has been switched off and subsequently restarted during a step A6. The terminal T and the UICC module 2 perform the steps A8 and B8 as described above with reference to the first implementation.

After step A8, the terminal T in this example sends (B31) a command AUDIT, which is of the APDU type in this example, to the UICC module 2. In this implementation, the command AUDIT enables the terminal to determine in return all of the elementary files that need to be updated.

In response to receiving (B32) the command AUDIT, the UICC module 2 identifies (B33) all of the elementary files FE stored in the UICC module 2, and having corresponding status data TG equal to 1. The UICC module 2 then sends (34) to the terminal T the identifiers ID of each elementary file for which the status data TG is equal to 1.

The devices ID sent B34 by the UICC module 2 constitute update data in the meaning of the invention.

In this example, the UICC module 2 detects B33 that only the status data TG2 is equal to 1, and consequently it sends (B34) the identifier ID2 to the terminal T in a message RESPONSE.

Thereafter, the terminal T uses the received identifiers to update A26 the elementary file FE2 in the cache memory 16. To do this, the steps A20, A22, A24, and A26, and also the steps B20, B22, and B24 are performed as described above with reference to the first implementation.

As mentioned above, the command AUDIT makes it possible, as described above, for the terminal T to determine in return all of the elementary files that need to be updated. The terminal thus updates (A26) in its cache memory 16 all of the elementary files identified in the message RESPONSE.

Alternatively, it is possible to envisage that the terminal T acts in a step B31 to send a selection request specifically identifying one or more elementary files for processing.

In this implementation, since the status data is binary data, the value of the data is reinitialized to the initial value "0" after the updating method has been implemented.

A third implementation of the invention is described below with reference mainly to FIG. 9.

In this third implementation, the UICC module 2 performs the step B2 as described above.

On each detection B2 of an operation of modifying an elementary file FE stored in the UICC module 2, the UICC module stores (B40) the identifier ID of the elementary file FE in question in a list given reference L2. In this example, the list L2 may be stored for example in the non-volatile memory 36. When an identifier ID is already in the list L2, it is not necessary for the UICC module 2 to add the identifier once more to the list L2 when a new modification to the corresponding elementary file FE is detected in step B2. By way of example, the list L2 continues to be updated until the terminal T is stopped, and thus the UICC module 2 is stopped.

In a manner analogous to the second implementation, management of the list L2, and more particularly the steps of the method from the point of view of the UICC module 2 in this third implementation are performed by an application or applet (e.g. a JAVACARD applet) that runs in the UICC module 2.

In this example, the terminal T and the UICC module 2 perform the steps A6, A8, B8, A10, B31, and B32 as described above with reference to the above implementations.

In particular, it is assumed that the terminal T is switched off and subsequently restarted during the step A6 as described above. After the step A10, the terminal T sends (B31) a command AUDIT, e.g. of the APDU type, to the UICC module 2.

In response to the command AUDIT that it receives (B32), the UICC module 2 sends (B42) to the terminal T all of the identifiers ID present in the list L2 (assuming that the list L2 contains at least one identifier).

It is assumed at this point that only the identifier ID1 of the elementary file FE2 is present in the list L2, such that the UICC module 2 sends ID2 to the terminal T in step B42. In this third implementation, this identifier ID2 constitutes update data DMJ2 in the meaning of the invention.

On receiving A42 the identifier ID2, the terminal T updates the A26 the file FE2 in the cache memory 16. To do this, the terminal T and the UICC module proceed as described above with reference to the above implementations.

In the second and third implementations as described above with reference to FIGS. 7 and 9, it should be observed that each identifier ID sent in step B34 and B42 to the terminal T may correspond to an element enabling the terminal to identify the corresponding elementary file FE, or alternatively to the elementary file FE itself. In this variant, there is no need for the terminal T subsequently to proceed with the operation of reading A20 the elementary file FE in question, as described above.

The person skilled in the art will understand that the above-described implementations and variants merely constitute non-limiting examples of how the invention can be implemented. In particular, the person skilled in the art can envisage any combination of the variants and implementations that are described above in order to satisfy any particular need.

The present invention presents numerous advantages. The updating method of the invention enables the memory (e.g. the cache memory) of a telecommunications terminal to be updated in optimized manner from data contained in the UICC module with which the terminal co-operates.

When the terminal starts, it is capable of determining which elementary files need to be updated in the memory in question and it then advantageously proceeds to read only those elementary files from the UICC module. As mentioned above, the operations of reading from the UICC module take time that correspondingly slows down the stage of starting the terminal. The invention makes it possible to limit the number of read operations that need to be performed in order to update the memory, thereby achieving a saving in time when starting the terminal, and thus significantly improving the quality of the user's experience.

Furthermore, the invention presents the advantage in that, on starting, the terminal is informed whenever updating is necessary. The terminal is capable of distinguishing between the situation in which the UICC module in question does not perform the method of the invention and the situation in which the UICC module does perform the method of the invention but there is no need to update the memory on starting the terminal.

Furthermore, there is no need to change fundamentally the stage of starting the terminal in order to embody the terminal. The modifications required in the operation of the terminal can easily be installed in present or future terminals.

In addition, if necessary, the invention can be retrofitted to telecommunications terminals and UICC modules that do not perform the invention. By way of example, a conventional telecommunications terminal does not take account of the update data (e.g. TLV objects) that it receives from the UICC module. Likewise, a conventional UICC module does not set about managing update data if it does not perform the invention.

The invention claimed is:

1. A method of updating the content of a memory in a telecommunications terminal suitable for co-operating with a subscriber identity module for accessing a telecommunications network, the method being performed by the subscriber identity module, the method comprising:
    detecting an operation of modifying at least one elementary file in said subscriber identity module; and
    generating update data associated with said at least one elementary file that has been modified, the update data indicating that the at least one elementary file has been modified; and
    the method further comprising during a stage of starting the telecommunications terminal, after the generating update data:
    receiving a start message coming from the telecommunications terminal;
    receiving a selection request from the telecommunications terminal to enable the subscriber identity module to identify the at least one elementary file that is contained in or used to be contained in the subscriber identity module;
    on receiving said selection request, sending the update data associated with said at least one elementary file to the telecommunications terminal to indicate thereto that said at least one elementary file was modified prior to the stage of starting the telecommunications terminal; and
    in response to sending said update data, receiving a read command from the telecommunications terminal and performing an operation of reading said at least one elementary file in compliance with the read command, thereby allowing the telecommunications terminal to update the memory with the at least one elementary file.

2. The method according to claim 1, wherein the selection request comprises an identifier of the at least one elementary file, the stage of starting the telecommunications terminal comprising recovering the update data based on the identifier in the selection request.

3. The method according to claim 1, wherein said generated update data is a random number or the value of a counter, said update data being modified on detecting each modification operation.

4. The method according to claim 1, wherein status data that can take a first value or a second value is associated with each elementary file contained in the subscriber identity module, and the method further comprises:
    on detecting each operation of modifying a elementary file, giving said second value to the status data associated with said elementary file; and
    wherein the update data sent by the subscriber identity module includes an identifier for each elementary file having its status data equal to the second value.

5. The method according to claim 1, further comprising:
    on detecting each operation of modifying a elementary file, storing an identifier of said elementary file in a list; and
    wherein the update data comprises said list.

6. A non-transitory processor readable data medium storing a computer program comprising instructions for executing the method of claim 1.

7. A method of updating the content of a memory in a telecommunications terminal suitable for co-operating with a subscriber identity module for accessing a telecommunications network, the method being performed by the telecommunications terminal, the method comprising during a stage of starting the telecommunications terminal:
    sending a start message to the subscriber identity module;
    sending a selection request to the subscriber identity module to enable the subscriber identity module to identify at least one elementary file for processing, wherein the at least one elementary file is contained in or used to be contained in said subscriber identity module;
    in response to said selection request, receiving update data associated with said at least one elementary file that is contained in or used to be contained in the subscriber identity module, said update data indicating that said at least one elementary file was modified prior to the stage of starting the telecommunications terminal;

on the basis of said received update data, determining, for each elementary file, whether said elementary file has been modified; and if so, updating said at least one elementary file in the memory of the telecommunications terminal.

8. The method according to claim 7, wherein the selection request comprises an identifier of said at least one elementary file.

9. The method according to claim 7, further comprising:
from a first list of at least one elementary file identifier, determining an identifier of said at least one elementary file to be processed or an identifier of a directory containing the identifier of said at least one elementary file, said directory being contained in the subscriber identity module; and
inserting said identifier in the selection request for sending to the subscriber identity module.

10. The method according to claim 7, further comprising:
prior to the starting stage, storing, in a non-volatile memory, reference data in association with said at least one elementary file;
wherein, during the determining, the terminal compares said reference data associated with said at least one elementary file and said update data to determine whether said at least one elementary file has been modified.

11. The method according to claim 10, wherein the terminal determines that said at least one elementary file has been modified when said reference data associated with said at least one elementary file and said update data are different.

12. The method according to claim 7, wherein the update data received from the subscriber identity module comprises an identifier for each elementary file.

13. A non-transitory processor readable data medium storing a computer program comprising instructions for executing the method of claim 7.

14. A subscriber identity module for performing a method of updating the content of a memory in a telecommunications terminal, said subscriber identity module being suitable for co-operating with the telecommunications terminal in order to enable said telecommunications terminal to access a telecommunications network, said subscriber identity module comprising:
a unit for detecting an operation of modifying at least one elementary file in said subscriber identity module;
a unit for generating update data associated with said at least one elementary file, said update data indicating that at least one elementary file has been modified;
a reception unit for receiving a start message from the telecommunications terminal during a stage of starting the telecommunications terminal;
a reception module for receiving a selection request from the telecommunications terminal, in order to enable the subscriber identity module to identify at least one elementary file for processing contained in or used to be contained in the subscriber identity module;
a send unit for acting on reception of said selection request to send the update data associated with said at least one elementary file to the telecommunications terminal to indicate thereto that said at least one elementary file was modified prior to the stage of starting the telecommunications terminal; and
a unit for reading said at least one elementary file file in compliance with a read command, thereby allowing the telecommunications terminal to update the memory with the at least one elementary file.

15. A telecommunications terminal for performing a method of updating the content of a memory of said telecommunications terminal, said telecommunications terminal being suitable for co-operating with a subscriber identity module in order to access a telecommunications network, the telecommunications terminal comprising:
a send unit for sending a start message to the subscriber identity module during a stage of starting the telecommunications terminal;
a send unit for sending a selection request to the subscriber identity module to enable the subscriber identity module to identify at least one elementary file for processing, wherein the at least one elementary file is contained in or used to be contained in the subscriber identity module;
a reception unit for receiving update data associated with at least one elementary file that is contained in or used to be contained in the subscriber identity module, said update data indicating that said at least one elementary file was modified prior to the stage of starting the telecommunications terminal;
a unit for acting on said received update data to determine for each elementary file whether said elementary file has been modified; and
a unit for updating said at least one elementary file in the memory of the telecommunications terminal, if the elementary file has been modified.

16. A telecommunications system comprising:
the telecommunications terminal of claim 15, said telecommunications terminal comprising a subscriber identity module, the subscriber identity module comprising:
a unit for detecting an operation of modifying at least one elementary file in the subscriber identity module;
a unit for generating update data associated with the modified at least one elementary file;
a reception unit for receiving a start message from the telecommunications terminal during a stage of starting the telecommunications terminal;
a reception module for receiving a selection request from the telecommunications terminal, in order to enable the subscriber identity module to identify at least one elementary file for processing contained in or used to be contained in the subscriber identity module;
a send unit for acting on reception of said selection request to send the update data associated with the at least one elementary file; and
a unit for reading the at least one elementary file for processing, in compliance with a read command received from the telecommunications terminal in response to sending the update data.

* * * * *